(12) United States Patent
Nakagawa

(10) Patent No.: US 8,964,222 B2
(45) Date of Patent: Feb. 24, 2015

(54) FACSIMILE APPARATUS THAT CONNECTS VIA SESSION INITIATION PROTOCOL AND CONTROL METHOD THEREFOR, AS WELL AS STORAGE MEDIUM

(75) Inventor: Kaori Nakagawa, Yokohama (JP)

(73) Assignee: Canon Kabushiki Kaisha (JP)

( * ) Notice: Subject to any disclaimer, the term of this patent is extended or adjusted under 35 U.S.C. 154(b) by 23 days.

(21) Appl. No.: 13/593,635

(22) Filed: Aug. 24, 2012

(65) Prior Publication Data

US 2013/0050755 A1 Feb. 28, 2013

(30) Foreign Application Priority Data

Aug. 24, 2011 (JP) .................. 2011-182650

(51) Int. Cl.
*G06F 3/12* (2006.01)
*H04N 1/00* (2006.01)
*H04N 1/327* (2006.01)
*H04N 1/32* (2006.01)
*H04N 1/333* (2006.01)

(52) U.S. Cl.
CPC ......... *H04N 1/0022* (2013.01); *H04N 1/32786* (2013.01); *H04N 1/32641* (2013.01); *H04N 1/32667* (2013.01); *H04N 1/32673* (2013.01); *H04N 1/32765* (2013.01); *H04N 1/33323* (2013.01)
USPC .......... 358/1.15; 358/400; 358/442; 358/1.16

(58) Field of Classification Search
USPC .................. 358/1.15, 1.1, 400, 442
See application file for complete search history.

(56) References Cited

U.S. PATENT DOCUMENTS

2004/0184110 A1* 9/2004 Maei et al. ............... 358/400
2007/0189490 A1* 8/2007 Sung ....................... 379/219

FOREIGN PATENT DOCUMENTS

JP 2005-303968 A 10/2005

* cited by examiner

*Primary Examiner* — Martin Mushambo
(74) *Attorney, Agent, or Firm* — Rossi, Kimms & McDowell LLP

(57) ABSTRACT

A facsimile apparatus which makes it possible to certainly perform facsimile communication via an IP network. The facsimile makes connection with a communication destination according to Session Initiation Protocol to perform facsimile communication with the communication destination via an IP network. A first connection sequence of starting call connection using a session of performing image communication is executed, and then a second connection sequence of starting call connection using a session of performing voice communication is executed. When one of the first connection sequence and the second connection sequence fails in the call connection, the other of the first connection sequence and the second connection sequence executes the call connection.

13 Claims, 5 Drawing Sheets

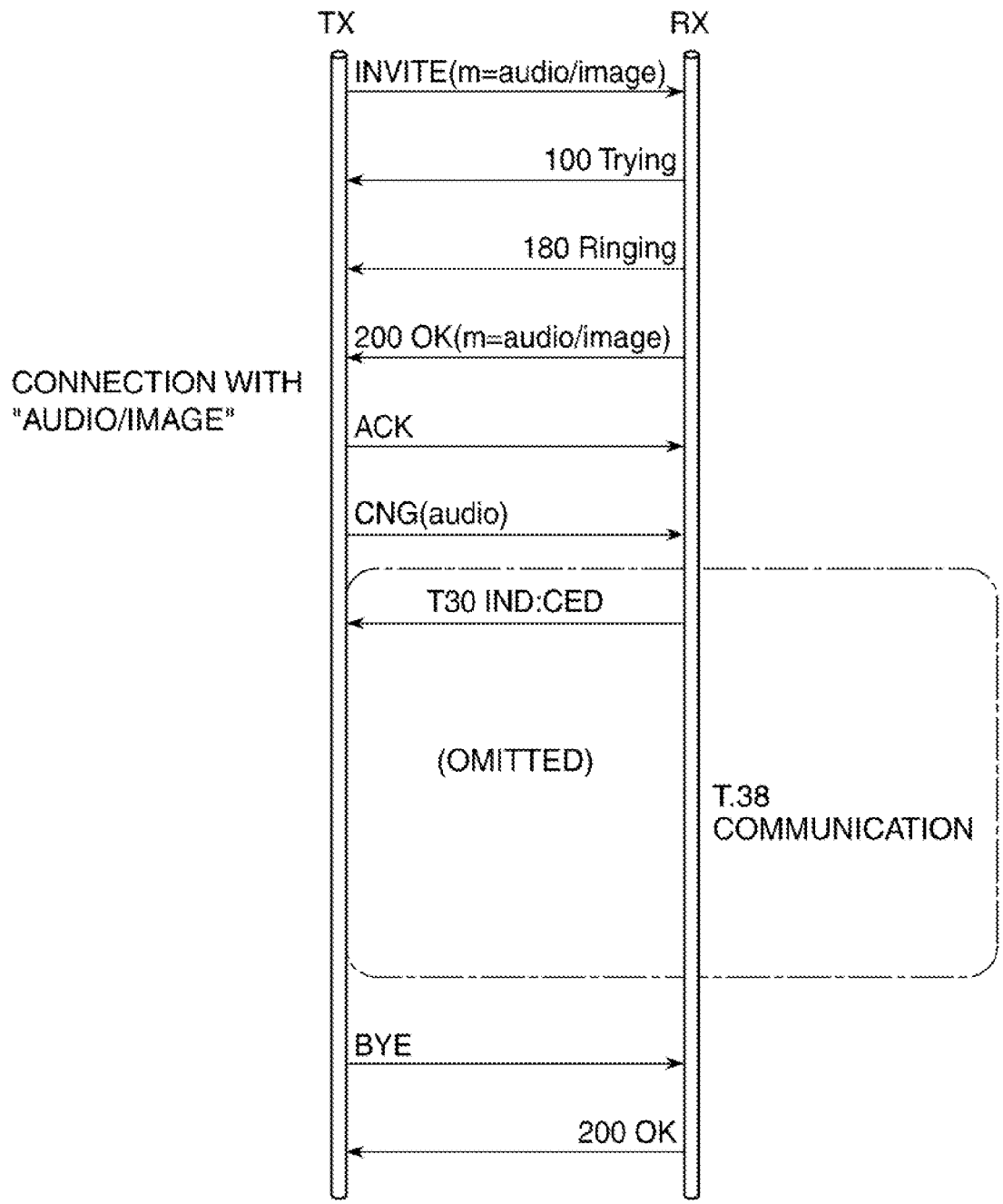

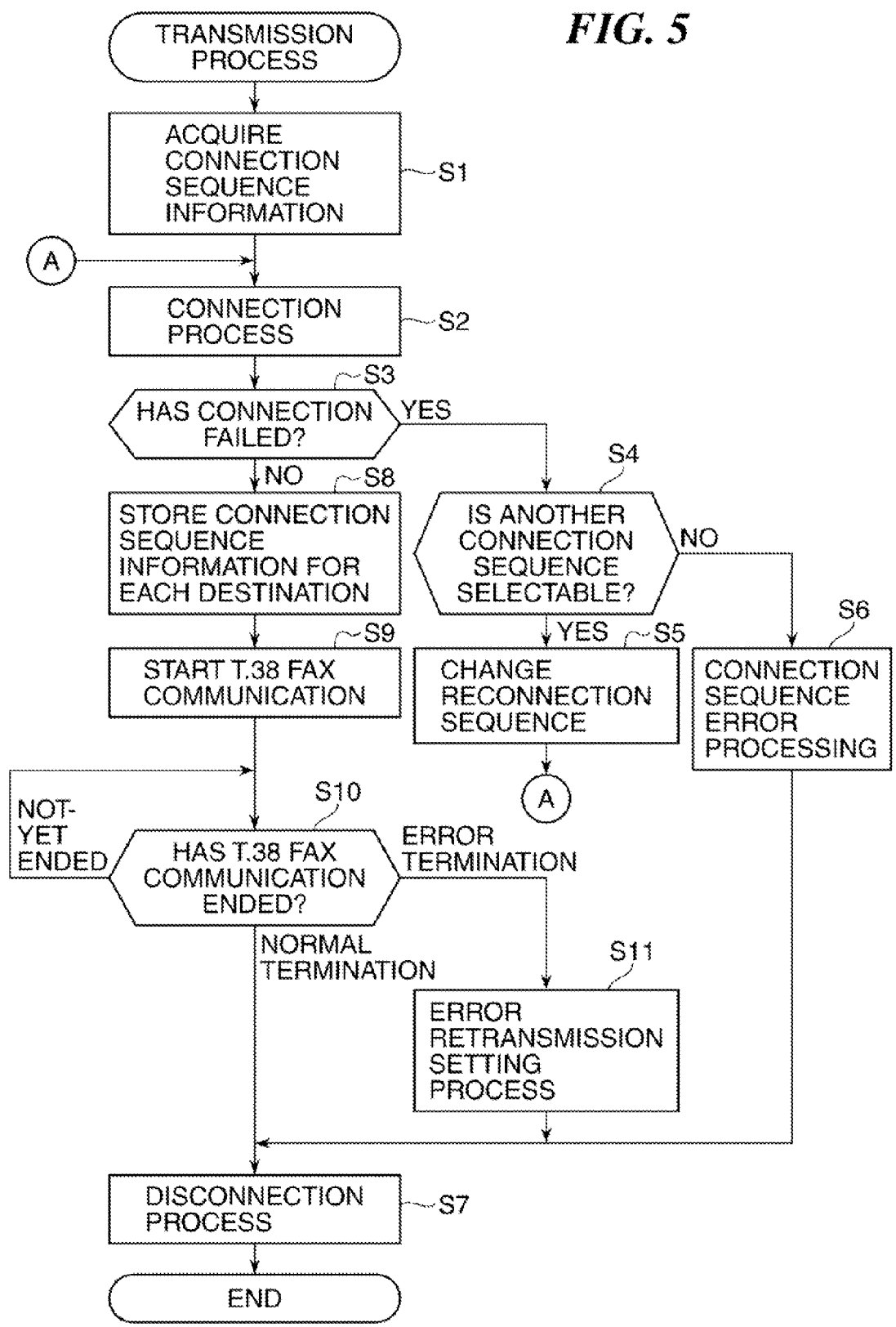

FACSIMILE APPARATUS THAT CONNECTS VIA SESSION INITIATION PROTOCOL AND CONTROL METHOD THEREFOR, AS WELL AS STORAGE MEDIUM

BACKGROUND OF THE INVENTION

1. Field of the Invention

The present invention relates to a facsimile apparatus that makes connection to a communication destination according to SIS (Session Initiation Protocol) to perform facsimile communication with the communication destination via an IP network, and a control method therefor, as well as a storage device.

2. Description of the Related Art

Recently, with spread of the Internet and IP phones, a method for using an IP network as a communication route for facsimile communication is being established. At the same time, a protocol for performing call control for executing generation, change and disconnection of a session for real-time communication, such as SIP (Session Initiation Protocol) is being standardized. Furthermore, the T.38 protocol for converting a G3 facsimile (T.30) signal to an IP message on an IP network to perform real-time transmission is recommended (ITU-T Recommendation T.38).

A real-time type Internet facsimile apparatus performs real-time facsimile communication on an IP network using SIP and T.38. This real-time type Internet facsimile apparatus identifies the address of a communication destination by SIP first and determines what data is to be transmitted by what protocol in data transmission between a transmission source and a reception destination. For this real-time type Internet facsimile apparatus, SDP (Session Description Protocol) is used. Though the name SDP includes "Protocol", it is actually what is obtained by formatting the form of describing media information. In the case of performing T.38 communication also, media classification of a session is used. The media classifications used are "image" or "application" in the case of T.38 communication, and "audio" in the case of voice communication (telephone call).

A conventional communication apparatus that performs communication control on the basis of communication destination information at the time of call connection by SIP obtains a call connection message from a communication destination apparatus in a predetermined call connection procedure performed prior to starting the T.38 communication. Then, the communication apparatus acquires communication destination attribute information as information indicating the attributes of the communication destination apparatus, from the obtained call connection message. Furthermore, such a communication apparatus is proposed that controls parameter values at the time of T.38 communication according to the acquired communication destination attribute information to control real-time type Internet facsimile communication (for example, see Japanese Laid-Open Patent Publication (Kokai) No. 2005-303968).

Equipment for performing SIP+T.38 communication includes a real-time type Internet facsimile apparatus, a T.38 GW or T.38 adapter, and there are multiple manufacturers that manufacture the equipment. Among the manufacturers or among models of the same manufacturer, there is difference in the adopted sequence for connection by the SIP protocol or difference in SDP description or the like accompanying difference in interpretation or function expansion.

Therefore, even between the same real-time type Internet facsimile apparatuses compatible with SIP+T.38 communication, a problem of connectivity or communicability, for example, a problem of communication sometimes being correctly performed and sometimes not being correctly performed may occur according to the manufacture or the model.

SUMMARY OF THE INVENTION

The present invention provides a facsimile apparatus which makes it possible to certainly perform facsimile communication via an IP network, and a control method therefor, as well as a storage device.

According to an aspect of the present invention, there is provided a facsimile apparatus that makes connection with a communication destination according to Session Initiation Protocol to perform facsimile communication with the communication destination via an IP network, the apparatus comprising: a first execution unit configured to execute a first connection sequence of starting call connection using a session of performing image communication; a second execution unit configured to execute a second connection sequence of starting call connection using a session of performing voice communication; and a control unit configured to cause, when one of the first connection sequence and the second connection sequence fails in the call connection, the other of the first connection sequence and the second connection sequence to execute the call connection.

According to the present invention, it is possible to certainly perform facsimile communication via an IP network. Specifically, for example, even between SIP+T.38 communication terminals with different connection sequences, it is possible to make a connection sequence for T.38 communication from SIP successful. Furthermore, even if error termination occurs during a T.38 communication facsimile procedure, it is possible to make connection by an optimum connection sequence at the time of reconnection.

Further features and advantages of the present invention will become apparent from the following detailed description of exemplary embodiments with reference to the attached drawings.

BRIEF DESCRIPTION OF THE DRAWINGS

FIG. 4 is a view useful in explaining T.38 communication by an audio/image simultaneous connection sequence executed by the facsimile apparatus of FIG. 1.

FIG. 5 is a flowchart showing the procedure of a transmission process executed by the facsimile apparatus of FIG. 1.

DETAILED DESCRIPTION OF THE EMBODIMENTS

The present invention will now be described in detail with reference to the drawings.

Figure 1:
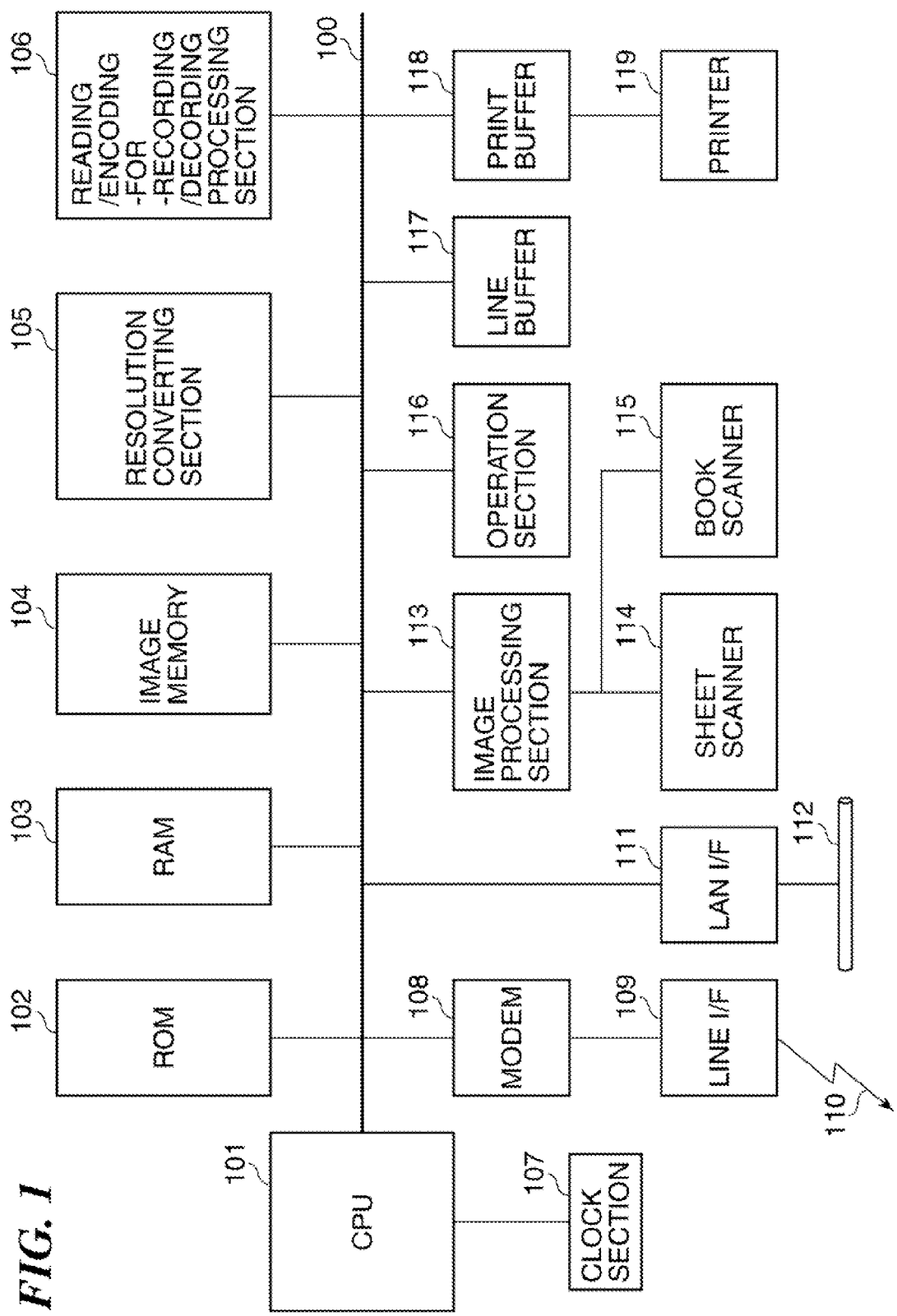
FIG. 1 is a block diagram schematically showing the configuration of a facsimile apparatus according to an embodiment of the present invention.

FIG. 1 is a block diagram schematically showing the configuration of a facsimile apparatus according to an embodiment of the present invention.

The facsimile apparatus of FIG. 1 is comprised of a real-time type network facsimile apparatus, of which a CPU (Central Processing Unit) 101 (control unit) constitutes a system control section which is responsible for controlling the whole apparatus. To the CPU 101 via a bus 100 are connected various function sections. Also to the CPU 101 is connected a clock section 107 for measuring operation intervals and the like, which is configured by an IC and the like.

The various function sections connected to the bus 100 include a ROM 102, a RAM 103, an image memory 104, a resolution converting section 105, a reading/encoding-for-recording/decoding processing section 106, a modem 108, a LAN I/F 111, an image processing section 113, an operation section 116, a line buffer 117, and a print buffer 118. The LAN I/F 111 controls a network.

The ROM 102 stores a control program for the CPU 101. The RAM 103 is comprised of a RAM or the like, and stores image data. The image memory 104 is comprised of a DRAM or the like, and stores image data.

The resolution conversion section 105 performs resolution conversion control such as millimeter-inch resolution conversion of raster data. Furthermore, the reading/encoding-for-recording/decoding processing section 106 (a codec for reading/recording) performs encoding/decoding processing of image data handled through a communication apparatus.

The CPU 101 is connected to an analog line 110 such as a PSTN via the modem 108 and a line I/F 109 connected to the modem 108. The modem 108 demodulates a modulated signal from the analog line 110 or, conversely, modulates a signal from the apparatus and sends the modulated signal to the analog line 110. The line I/F 109 constitutes a control section comprised of an NCU or the like. The line I/F 109 has, in a case where a telephone set has two connection terminals, a hook detection circuit for each connection terminal of the telephone set to detect off-hook of the telephone set and on-hook at the each terminal.

The CPU 101 is connected to an IP network 112, such as a local IP network and an NGN, via the LAN I/F 111.

The CPU 101 is connected to a sheet scanner 114 and a book scanner 115 via the image processing section 113. Each of the sheet scanner 114 and the book scanner 115 is comprised of a CS image sensor, an original feeding mechanism and the like, and optically reads an original while covering it to electrical image data, and further adapted to read a both-sided original. Image data read by the sheet scanner 114 or the book scanner 115 is correction-processed by the image processing section 113, and subsequently outputted with being converted to high-resolution image data.

The operation section 116 is comprised of a keyboard, a display section and the like, through which operation section 116 an operator performs various input operations. The operation section 116 displays that an immediate dial operation is possible when a handset is off-hooked, and displays that communication is being performed and communication reservation is acceptable when an externally attached telephone is off-hooked.

The line buffer 117 is used when image data transfer control is performed via the bus 100.

A printer 119 is connected to the CPU 101 via the print buffer 118. The print buffer 118 is a buffer memory corresponding to one page, which is for storing character codes for printing. This printer 119 is a printer such as an LBP for recording a received image or file data onto plain paper, and adapted to execute both-sided printing.

Figure 2:
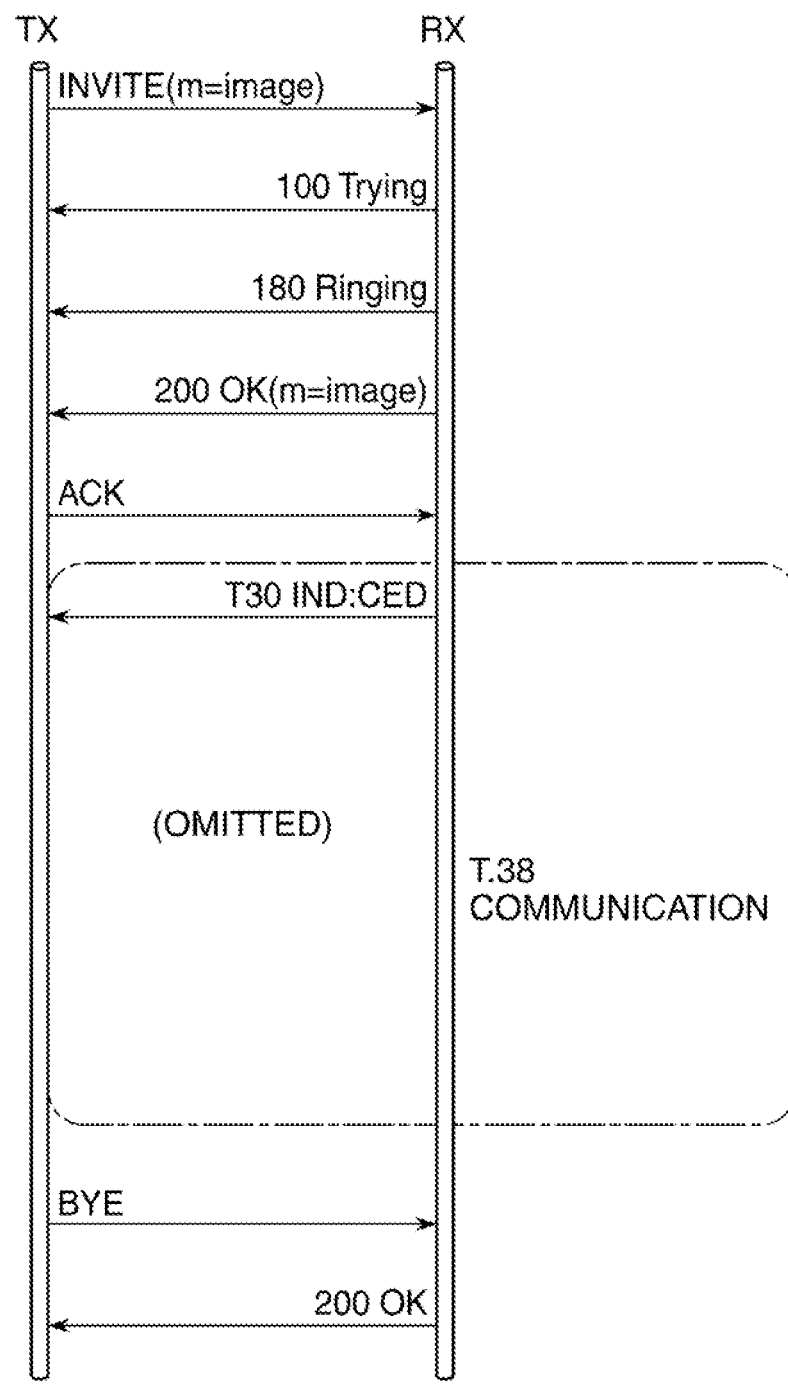
FIG. 2 is a view useful in explaining T.38 communication by a standard SIP connection sequence executed by the facsimile apparatus of FIG. 1.

FIG. 2 is a view useful in explaining T.38 communication by a standard SIP connection sequence executed by the facsimile apparatus in FIG. 1.

A transmission source (TX) transmits, to a reception destination (RX), an INVITE request (a session establishment request) for a session with "image" specified as the media classification (m) from the transmission source. Receiving this INVITE request, the reception destination returns 200 OK (successful) response to the transmission source after responses of 100 Trying (performing processing) and 180 Ringing (performing calling). Then, the transmission source returns ACK (acknowledgement) to the reception destination, thereby allowing a session with m=image to be established, followed by T.38 communication being started.

After this T.38 communication ends, the transmission source transmits BYE (disconnection) to the reception destination. Receiving this BYE, the reception destination returns 200 OK (successful), followed by the T.38 communication by the standard SIP connection sequence being completed.

Figure 3:
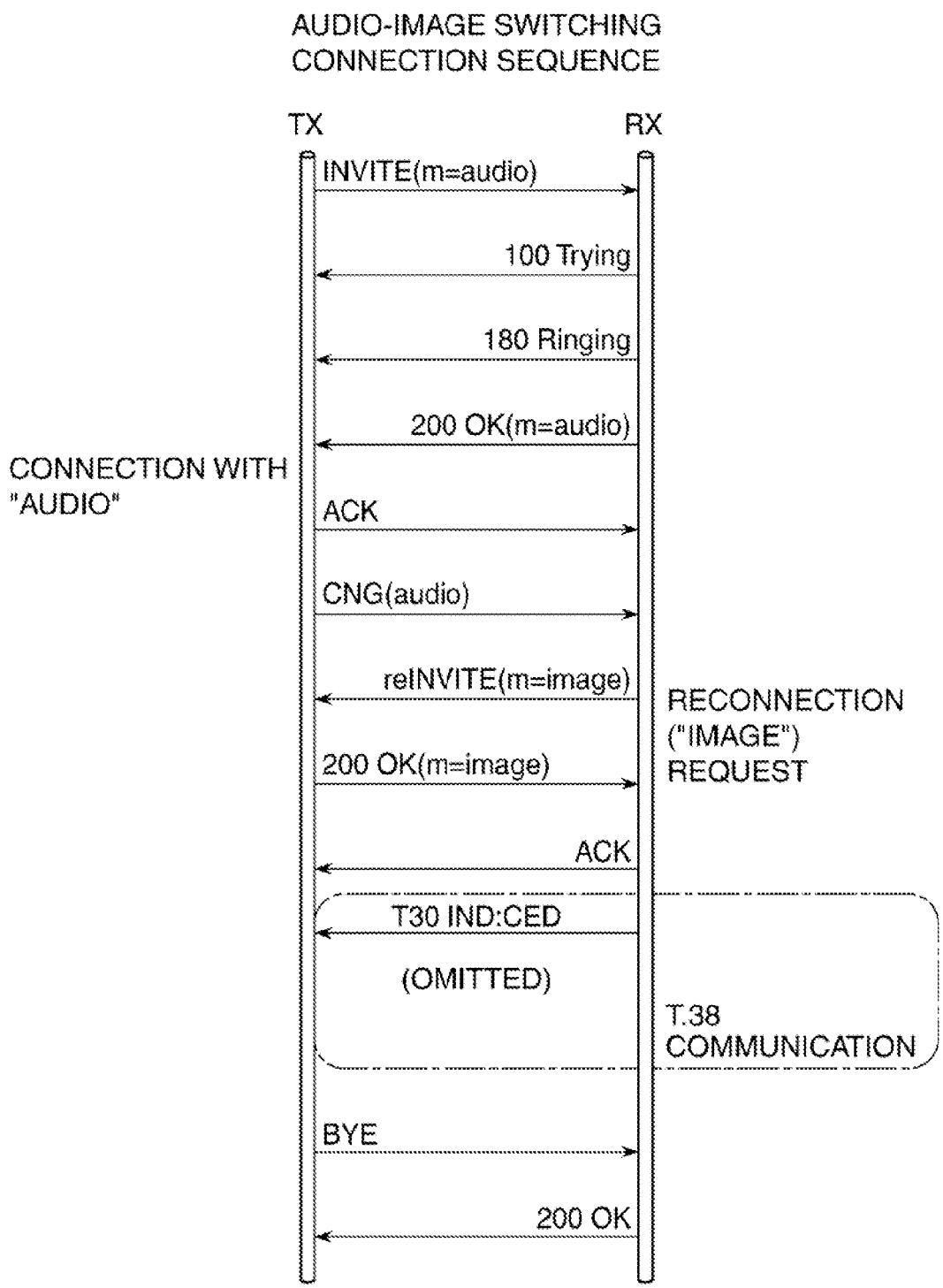
FIG. 3 is a view useful in explaining T.38 communication by an audio-image switching connection sequence executed by the facsimile apparatus of FIG. 1.

FIG. 3 is a view useful in explaining T.38 communication by an audio-image switching connection sequence executed by the facsimile apparatus of FIG. 1.

The transmission source (TX) transmits, to the reception destination (RX), an INVITE request (a session establishment request) for a session with "audio" specified as the media classification (m) from the transmission source. Receiving this INVITE request, the reception destination returns 200 OK (successful) response to the transmission source after responses of 100 Trying (performing processing) and 180 Ringing (performing calling). When the transmission source returns ACK (acknowledgement) of the transmission source to the reception destination, a session with m=audio is once generated.

Next, when detecting a CNG signal from the transmission source during the session with m=audio, the reception destination judges that the transmission source has FAX capability. The reception destination sends a reINVITE request (a session establishment request) for a session with "image" specified as the media classification (m) to request generation of a session with m=image to the transmission source.

With ACK (acknowledgement) of the reception destination in response to 200 OK (successful) by the transmission source which has received the session generation request, a session with m=image is established, followed by T.38 communication being started. After the T.38 communication ends, the transmission source transmits BYE (disconnection) to the reception destination. Receiving this BYE, the reception destination to the returns 200 OK (successful) to the transmission source, followed by the T.38 communication using the standard SIP connection sequence being completed.

FIG. 4 is a view useful in explaining T.38 communication by an audio/image simultaneous connection sequence executed by the facsimile apparatus of FIG. 1.

The transmission source (TX) transmits, to the reception destination (RX), an INVITE request for sessions with "audio" and "image" specified as the media classification (m). Receiving this INVITE request, the reception destination returns 200 OK (successful) response for sessions compatible with the media classification (m) of "audio" and "image", to the transmission source after responses of 100 Trying (performing processing) and 180 Ringing (performing calling). Then, when the transmission source returns ACK (acknowledgement) to the reception destination, two sessions with m=audio and m=image are established.

After that, when detecting a CNG signal from the transmission source during the session with m=audio, the reception destination starts T.38 communication in the session with m=image. Then, the transmission source transmits BYE (disconnection) to the reception destination. When the reception destination returns 200 OK (successful) to the transmission source, the T.38 communication by the standard SIP connection sequence is completed.

FIG. 5 is a flowchart showing the procedure of a transmission process executed by the facsimile apparatus of FIG. 1.

The process in FIG. 5 is executed by the CPU 101, and it includes connection sequence selection processing at the time of origination by the real-time type network facsimile apparatus and transmission processing related to T.38 communication.

In FIG. 5, when a transmission instruction is inputted by a user, the transmission process is started. The CPU 101 acquires preset connection sequence information (any of the origination sequences in FIGS. 2, 3, and 4) at the time of origination (step S1) and starts connection processing (step S2).

Next, it is determined whether the connection has failed or not (step S3). If the connection has failed with error termination (YES to the step S3), then it is determined whether or not another connection sequence is selectable (step S4).

If, as a result of the determination of the step S4, the another connection sequence is selectable (YES to the step S4), the sequence for reconnection is changed to the selected connection sequence (step S5), followed by repeating the processing the step S2 et seq.

If, as a result of the determination of the step S4, the another connection sequence is not selectable (NO to the step S4), error processing, such as acquisition of a connection sequence log, is executed (step S6) and subsequently disconnection processing is executed (step S7), followed by the process terminating.

If, as a result of the determination of the step S3, the connection sequence normally ends (NO to the step S3), information about the successful connection sequence is stored in association with the destination and stored to enable T.38 communication (step S8), followed by T.38 communication (facsimile communication) being started (step S9) in order to proceed to a procedure for performing T.38 communication (facsimile communication).

Next, it is determined whether or not the T.38 communication (facsimile communication) has ended and whether the T.38 communication has ended in error termination or in normal termination (step S10). If T.38 communication (facsimile communication) has ended in error termination, an error communication log in the T.38 communication procedure is acquired and stored, and error retransmission setting processing is performed (step S11), and then disconnection processing is performed (step S7), followed by the process terminating. Because an "error" in the error retransmission setting processing in the step S11 is an error in the T.38 procedure, the connection sequence information is not changed.

In short, the facsimile apparatus according to the embodiment of the present invention performs facsimile communication via an IP network. A transmission-source facsimile apparatus performs multiple call connections to a reception-destination facsimile apparatus.

A connection sequence for the multiple call connections includes, for example, a connection sequence of starting call connection using a session of performing image communication and a connection sequence of starting a session of performing voice communication. Furthermore, the connection sequence for the multiple call connections includes a connection sequence of starting call connection using a session of performing image communication and a session of performing voice communication, simultaneously.

The sequence for generating a session for performing image communication is a connection sequence by the standard SIP connection procedure using the media classification of "image" or "application". The connection sequence for generating a session for performing voice communication is a connection sequence by the standard SIP connection procedure using the media classification of "audio".

The control unit of the facsimile apparatus of the present invention is configured such that, if failing in connection by a connection sequence unit used for a call connection first, it attempts reconnection with a connection sequence unit other than the connection sequence unit which has failed in the connection.

In this facsimile apparatus, when a FAX signal is detected after performing connection with the media classification of "audio", the media classification is changed to "image" or "application" to perform reconnection.

In the case of the connection sequence for generating sessions for voice communication and image communication at the same time, connection is performed in two sessions of both media classifications of "audio" and "image", or "audio" and "application". In this connection sequence for performing connection with both media classifications, when a FAX signal is detected after performing connection with the media classification of "audio", the media classification is changed to "image" or "application" to perform reconnection. In this connection sequence for performing connection with both media classifications, connection is performed in two sessions with both media classifications of "audio" and "image", or "audio" and "application". In this connection sequence for performing connection with both media classifications, a FAX signal is detected in the session with the media classification of "audio", and T.38 communication (facsimile communication) is performed in the already connected session of "image" or "application".

Aspects of the present invention can also be realized by a computer of a system or apparatus (or devices such as a CPU or MPU) that reads out and executes a program recorded on a memory device to perform the functions of the above-described embodiment, and by a method, the steps of which are performed by a computer of a system or apparatus by, for example, reading out and executing a program recorded on a memory device to perform the functions of the above-described embodiment. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Applications No. 2011-182650, filed Aug. 24, 2011, which is hereby incorporated by reference herein in its entirety.

What is claimed is:

1. A facsimile apparatus that makes connection with a communication destination according to Session Initiation Protocol to perform facsimile communication with the communication destination via an IP network, the apparatus comprising:
   a first execution unit configured to execute a first connection sequence of starting call connection using a session of performing image communication;
   a second execution unit configured to execute a second connection sequence of starting call connection using a session of performing voice communication;
   a setting unit configured to set the first connection sequence or the second connection sequence; and a control unit configured to cause, in a case where the first connection sequence is set by the setting unit, the first execution unit to execute the first connection sequence and then cause the second execution unit to execute the second connection sequence in a case where the first connection sequence fails in the call connection, and to cause, in a case where the second connection sequence is set by the setting unit, the second connection executing unit to execute the second connection sequence, and then cause the first execution unit to execute the first connection sequence in a case where the second connection sequence fails in the call connection.

2. The facsimile apparatus as claimed in claim 1, further comprising a third execution unit configured to execute a third connection sequence of starting the call connection using both of the session of performing the image communication and the session of performing the voice communication.

3. The facsimile apparatus as claimed in claim 1, further comprising a storing unit configured to store, in association with the communication destination, information representing the connection sequence used for the call connection, when the facsimile apparatus proceeds to a procedure of performing the facsimile communication,
wherein said control unit makes reconnection using the connection sequence represented by the stored information, when there occurs an error during the facsimile communication.

4. The facsimile apparatus as claimed in claim 1, wherein the session of performing the voice communication is switched to the session of performing the image communication during the call communication in the second connection sequence.

5. The facsimile apparatus as claimed in claim 1, wherein the facsimile communication satisfies the ITU-T Recommendation T.38.

6. The facsimile apparatus as claimed in claim 1, further comprising a reading unit configured to read an image on an original to generate image data,
wherein the facsimile apparatus transmits the image data generated by the reading unit by the facsimile communication.

7. A control method for a facsimile apparatus that makes connection with a communication destination according to Session Initiation Protocol to perform facsimile communication with the communication destination via an IP network, the control method comprising:
a first execution step of executing a first connection sequence of starting call connection using a session of performing image communication;
a second execution step of executing a second connection sequence of starting call connection using a session of performing voice communication;
a setting step of setting the first connection sequence or the second connection sequence; and
a control step of causing, in a case where the first connection sequence is set in the setting step, the first execution unit to execute the first connection sequence and then causing the second execution unit to execute the second connection sequence in a case where the first connection sequence fails in the call connection, and causing, in a case where the second connection sequence is set in the setting step, the second connection executing unit to execute the second connection sequence and then cause the first execution unit to execute the first connection sequence in a case where the second connection sequence fails in the call connection.

8. The control method as claimed in claim 7, further comprising a third execution step of executing a third connection sequence of starting the call connection using both of the session of performing the image communication and the session of performing the voice communication.

9. The control method as claimed in claim 7, further comprising a storing step of storing, in association with the communication destination, information representing the connection sequence used for the call connection, when the facsimile apparatus proceeds to a procedure of performing the facsimile communication,
wherein said control unit step comprises making reconnection using the connection sequence represented by the stored information, when there occurs an error during the facsimile communication.

10. The control method as claimed in claim 7, wherein the session of performing the voice communication is switched to the session of performing the image communication on the way of the call communication in the second connection sequence.

11. The control method as claimed in claim 7, wherein the facsimile communication satisfies the ITU-T Recommendation T.38.

12. The control method as claimed in claim 7, further comprising a reading step of reading an image on an original to generate image data,
wherein the facsimile apparatus transmits the image data generated at the reading step by the facsimile communication.

13. A non-transitory computer-readable storage medium storing a control program executing a control method a facsimile apparatus that makes connection with a communication destination according to Session Initiation Protocol to perform facsimile communication with the communication destination via an IP network, the control method comprising:
a first execution step of executing a first connection sequence of starting call connection using a session of performing image communication;
a second execution step of executing a second connection sequence of starting call connection using a session of performing voice communication;
a setting unit configured to set the first connection sequence or the second connection sequence; and
a control step of causing, in a case where the first connection sequence is set in the setting step, the first execution unit to execute the first connection sequence and then causing the second execution unit to execute the second connection sequence in a case where the first connection sequence fails in the call connection, and causing, in a case where the second connection sequence is set in the setting step, the second connection executing unit to execute the second connection sequence and then cause the first execution unit to execute the first connection sequence in a case where the second connection sequence fails in the call connection.

* * * * *